United States Patent
Chen et al.

(10) Patent No.: US 10,274,342 B2
(45) Date of Patent: Apr. 30, 2019

(54) ROTATING SENSING DEVICE AND ROTATING SENSING METHOD

(71) Applicant: Industrial Technology Research Institute, Hsinchu (TW)

(72) Inventors: Chin-Ming Chen, Taichung (TW); Po-Hsiu Ko, Taichung (TW); Szu-Chia Lin, Yilan County (TW); Meng-Chiou Liao, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 253 days.

(21) Appl. No.: 15/393,269

(22) Filed: Dec. 29, 2016

(65) Prior Publication Data

US 2018/0149494 A1 May 31, 2018

(30) Foreign Application Priority Data

Nov. 30, 2016 (TW) .............................. 105139389 A

(51) Int. Cl.
*G01D 5/14* (2006.01)
*G01D 5/16* (2006.01)
(Continued)

(52) U.S. Cl.
CPC .............. *G01D 5/145* (2013.01); *G01D 5/16* (2013.01); *G01M 5/0083* (2013.01); *G01P 3/487* (2013.01)

(58) Field of Classification Search
USPC ...... 324/207.2, 207.25; 73/493, 494, 504.07, 73/504.18, 863.56
See application file for complete search history.

(56) References Cited

U.S. PATENT DOCUMENTS 4,554,805 A   11/1985   Hirooka et al.
5,880,586 A    3/1999   Dukart et al.
(Continued)

FOREIGN PATENT DOCUMENTS

CN   102025252   4/2011
TW   200617356   6/2006
(Continued)

OTHER PUBLICATIONS

Wang et al., "Based on Hall Sensor to Measure the Rotational Speed of the Objects", Feng Chia University, Department of Automatic Control Engineering, Thesis, Dec. 2008, pp. 1-51.
Jing-Yin Chen., "Research on Accuracy Improvement of an Angle Sensor by an Eccentric Ring Magnet", National Yunlin University of Science & Technology, Department of Mechanical Engineering, Master Thesis, Jun. 2013, pp. 1-53.
(Continued)

*Primary Examiner* — Vincent Q Nguyen
(74) *Attorney, Agent, or Firm* — JCIPRNET

(57) ABSTRACT

A rotating sensing device includes a base, a rotating element, at least one magnetic element set, at least one magnetic sensing element set, and a processing unit. The magnetic element set is arranged on the rotating element and includes an axial magnetic element and a radial magnetic element. The magnetic sensing element set is arranged on the base and includes an axial magnetic sensing element and a radial magnetic sensing element. When the rotating element is rotated relatively to the base, a magnetic variation relative to the axial magnetic element and a magnetic variation relative to the radial magnetic element are respectively sensed by the axial magnetic sensing element and the radial magnetic sensing element, so as to generate a sensing signal. The processing unit is adapted to obtain a rotation speed, a loading value, and a deflection value. In addition, a rotating sensing method is also provided.

17 Claims, 4 Drawing Sheets

(51) Int. Cl.
  *G01P 3/487* (2006.01)
  *G01M 5/00* (2006.01)

(56) References Cited

U.S. PATENT DOCUMENTS

| | | | |
|---|---|---|---|
| 6,731,032 | B1 | 5/2004 | Muszynski |
| 6,762,897 | B1 | 7/2004 | Kabashima et al. |
| 2003/0128026 | A1 | 7/2003 | Lutz |
| 2005/0222740 | A1* | 10/2005 | Inoue ............... B60B 27/00 701/70 |
| 2013/0218517 | A1* | 8/2013 | Ausserlechner ....... G01B 7/30 702/151 |

FOREIGN PATENT DOCUMENTS

| TW | M376827 | 3/2010 |
|---|---|---|
| TW | 201233045 | 8/2012 |

OTHER PUBLICATIONS

Jyong-Ling Chen., "Signal process and electrical interpolation for optical encoder", MingDao University, Department of Energy Engineering cum photoelectric, Master Thesis, Jan. 2010, pp. 1-64.

Chia-Hao Chang., "Speed Estimation Algorithms for Low-Resolution Encoders", LungHwa University of Science and Technology, Department of Electronic Engineering, Master Thesis, Jun. 2010, pp. 1-95.

Yang et al., "Axial and Radial Position Sensing for a Magnetically Levitated Rotor Using Hall Sensors", The 33rd Annual Conference of the IEEE Industrial Electronics Society (IECON), Nov. 5-8, 2007, pp. 2225-2229.

Lee et al, "Applications of Linear Hall-Effect Sensors on Angular Measurement", 2011 IEEE International Conference on Control Applications (CCA), Sep. 28-30, 2011, pp. 479-482.

"Office Action of Taiwan Counterpart Application," dated Dec. 11, 2017, p. 1-p. 8.

* cited by examiner

ROTATING SENSING DEVICE AND ROTATING SENSING METHOD

CROSS-REFERENCE TO RELATED APPLICATION

This application claims the priority benefit of Taiwan application serial no. 105139389, filed on Nov. 30, 2016. The entirety of the above-mentioned patent application is hereby incorporated by reference herein and made a part of this specification.

TECHNICAL FIELD

The disclosure relates to a sensing device and a sensing method, and particularly relates to a rotating sensing device and a rotating sensing method for machine tool.

BACKGROUND

With the progress in automatic control techniques, automatic machine tool has already gone mainstream in the market. In general, the automatic machine tool may be equipped with different kinds and numbers of sensing elements for sensing the operation state of its components. In terms of rotating elements such as a rotating working table or spindles of the automatic machine tool, different kinds of sensing elements are required for sensing rotation speed, deflection, and load of the rotating elements. For example, a rotating encoder and an infrared tachometer may be used to sense the rotation speed of the rotating element, a pressure sensing device may be used to sense the load of a rotating element, and an eddy current sensing device may be used to sense the deflection of the rotating element.

However, said arrangement requires multiple sensing devices to be integrated into a single sensing module, which increases relevant costs and requires excessively large spaces. In addition, if one of the sensors is damaged and fails, then the sensing module has to be replaced or repaired and then can be operated as usual; that is, excessive kinds of sensors lead to low reliability. Moreover, the sensing module constituted by the multiple sensors is often arranged in embedding manner, such that the rotating element has to be dismantled to perform the replacement and the repair, which greatly increases labor costs and repair time.

SUMMARY

The disclosure provides a rotating sensing device and a rotating sensing method with a good sensing ability, which may saving arranging and repairing costs, saving arrangement spaces, and enhancing reliability of the rotating sensing device.

In an embodiment of the disclosure, a rotating sensing device includes a base, a rotating element, at least one magnetic element set, at least one magnetic sensing element set, and a processing unit. The rotating element may be rotatably connected to the base. The magnetic element set is disposed on the rotating element and includes an axial magnetic element and a radial magnetic element. The magnetic sensing element set is disposed on the base and includes an axial magnetic sensing element and a radial magnetic sensing element. When the rotating element is rotated relatively to the base, a magnetic variation relative to the axial magnetic element and a magnetic variation relative to the radial magnetic element are respectively sensed by the axial magnetic sensing element and the radial magnetic sensing element, so as to generate a sensing signal. The processing unit is coupled to the magnetic sensing element set and adapted to obtain a rotation speed, a loading value, and a deflection value.

In an embodiment of the disclosure, a rotating sensing method includes following steps. Signal-loading value relation information and signal-deflection value relation information are established. A rotating element is driven to rotate relatively to a base, wherein at least one magnetic element set is arranged on the rotating element and includes an axial magnetic sensing element and a radial magnetic sensing element, and at least one magnetic sensing element set is arranged on the base and includes an axial magnetic sensing element and a radial magnetic sensing element. A magnetic variation relative to the axial magnetic element and a magnetic variation relative to the radial magnetic element are respectively sensed by the axial magnetic sensing element and the radial magnetic sensing element, so as to generate a sensing signal. A rotation speed of the rotating element is obtained by the processing unit according to the sensing signal, a loading value of the rotating element is obtained by the processing unit according to the signal-loading value relation info illation and the sensing signal, and a deflection value of the rotating element is obtained by the processing unit according to the signal-deflection value relation information and the sensing signal.

Based on the description, the rotation speed, the loading value, and the deflection value of the rotating element provided herein are simultaneously sensed by the rotating sensing device through the magnetic element set and the magnetic sensing element set, instead of being sensed by multiple sensors according to the related art, so as to save the arrangement costs of the rotating sensing device. Furthermore, when a quantity of the magnetic element set and a quantity of the magnetic sensing element set are both plural, if one of the magnetic sensing elements is damaged and fails, the sensing action may be carried out by other magnetic sensing elements in no need of immediately repairing and replacing the rotating sensing device, and thus the repair cost is saved and the reliability is guaranteed. In addition, the arrangement space may be saved, for the rotating sensing device provided herein is not equipped with multiple sensors as in the related art. Moreover, the magnetic element set includes the radial magnetic element and the axial magnetic element, and the magnetic sensing element set accordingly includes the axial magnetic sensing element and the radial magnetic sensing element, thus enabling the rotating sensing device to simultaneously sense a displacement of the rotating element along an axial direction and a displacement of the rotating element along a radial direction. Hence, the loading value and the deflection value of the rotating element are obtained accurately, so as to equip the rotating sensing device with a good sensing ability.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
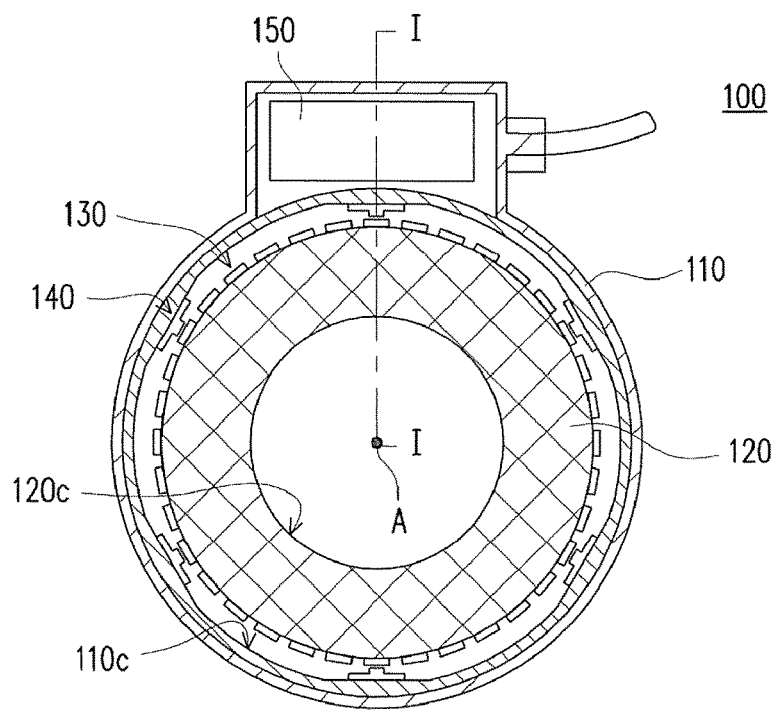
FIG. 1 is a top view of a rotating sensing device according to an embodiment of the disclosure.
Figure 2:
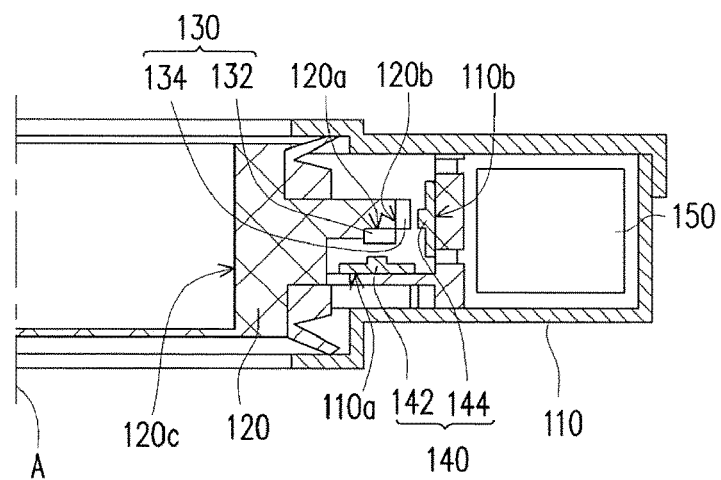
FIG. 2 is a cross-sectional view of the rotating sensing device along a line I-I depicted in FIG. 1.

FIG. 1 is a top view of a rotating sensing device according to an embodiment of the disclosure. FIG. 2 is a cross-sectional view of the rotating sensing device along a line I-I depicted in FIG. 1. Please refer to FIG. 1 and FIG. 2. The rotating sensing device 100 provided in the present embodiment includes a base 110, a rotating element 120, a plurality of magnetic element sets 130 (36 magnetic element sets shown in FIG. 1), a plurality of magnetic sensing element sets 140 (6 magnetic sensing element sets shown in FIG. 1), and a processing unit 150. The rotating element 120 is rotatably connected to the base 110 along an axis A, the magnetic element sets 130 are arranged on the rotating element 120, and the magnetic sensing element sets 140 are arranged on the base 110.

Figure 3:
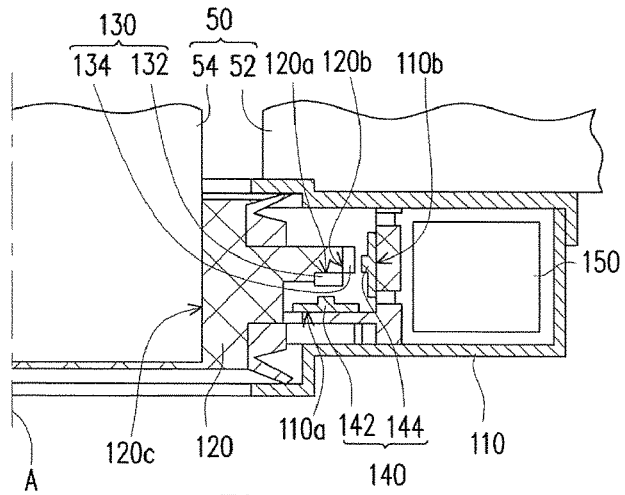
FIG. 3 illustrates the rotating sensing device depicted in FIG. 2 is arranged in a rotating element of equipment under test.

FIG. 3 illustrates the rotating sensing device depicted in FIG. 2 is arranged in a rotating element of equipment under test. As illustrated in FIG. 3, the base 110 and the rotating element 120 may be respectively connected to a fixed end 52 of a rotating element 50 (e.g., a rotation spindle assembly of a machine tool) of the equipment under test and to a rotation spindle 54 of the rotating element 50 of the equipment under test. When the rotating element 120 rotates with the rotation spindle 54, the magnetic variations of the magnetic element sets 130 are sensed by the magnetic sensing element sets 140 on the base 110, so as to obtain rotation speed, loading values, and deflection values of the rotating element 120 and the rotation spindle 54. The specific arrangement and the operation of the magnetic sensing element sets 140 and the magnetic element sets 130 are described below.

As illustrated in FIG. 2 and FIG. 3, each magnetic element set 130 includes an axial magnetic element 132 and a radial magnetic element 134, each magnetic sensing element set 140 includes an axial magnetic sensing element 142 and a radial magnetic sensing element 144, the axial magnetic element 132 is aligned with the axial magnetic sensing element 142, and the radial magnetic element 134 is aligned with the radial magnetic sensing element 144. In the present embodiment, the axial magnetic element 132 and the radial magnetic element 134 are magnets, and the axial magnetic sensing element 142 and the radial magnetic sensing element 144 are, for example, Hall sensors, magneto-resistive sensors, or other appropriate magnetic sensors, but the disclosure is not limited thereto.

When the rotating element 120 is rotated relatively to the base 110 along the axis A, a magnetic variation relative to the axial magnetic element 132 and a magnetic variation relative to the radial magnetic element 134 are respectively sensed by the axial magnetic sensing element 142 and the radial magnetic sensing element 144, so as to generate a sensing signal. The processing unit 150 is coupled to the magnetic sensing element sets 140 and is adapted to obtain rotation speed, loading values, and deflection values of the rotating element 120 and the rotation spindle 54 according to the sensing signal. The loading value, for example, refers to the loading value of the rotating element 120 along the axial direction (i.e. the extension direction of the axis A). The deflection value, for example, refers to the deflection generated along the axial direction and the radial direction due to incomplete coincidence between the actual rotating axis of the rotation spindle 54 and the axis A. In the present embodiment, the processing unit 150 is, for instance, a micro control unit (MCU), but the disclosure is not limited thereto.

Based on the above mode of arrangement, the rotation speed, the loading value, and the deflection value of the rotating element 100 are simultaneously sensed by the rotating sensing device 100 through the magnetic element set 130 and the magnetic sensing element set 140, instead of sensing the rotation speed, the loading value, and the deflection value of an object by various sensors according to the related art, so as to save the costs of the rotating sensing device 100. Furthermore, when the quantity of the magnetic element set 130 and the quantity of the magnetic sensing element set 140 are both plural, if one of the axial magnetic sensing elements 142 or one of the radial magnetic sensing elements 144 is damaged and fails, the sensing action may be performed by other magnetic sensing elements in no need of immediately repairing and replacing the rotating sensing device 100, and thus the repair cost is saved and the reliability is guaranteed. The same also applies if the radial magnetic element 132 or the axial magnetic element 134 is damaged.

In addition, the arrangement space is saved, for the rotating sensing device 100 is not equipped with multiple sensors as provided in the related art. Moreover, the magnetic element set 130 includes the radial magnetic element 132 and the axial magnetic element 134, and the magnetic sensing element set 140 correspondingly includes the axial magnetic sensing element 142 and the radial magnetic sensing element 144, thus enabling the rotating sensing device 100 to simultaneously sense a displacement of the rotating element 120 along an axial direction and a displacement of the rotating element 120 along a radial direction. Hence, the loading value and the deflection value of the rotating element 120 are obtained accurately, so as to equip the rotating sensing device 100 with a good sensing ability. On the other hand, the rotating sensing device 100 is not embedded in the rotating element 50 of the equipment under test; instead, the base 110 and the rotating element 120 of the rotating sensing device 100 are respectively connected to the fixed end 52 of the rotating element 50 and the rotation spindle 54 of the rotating element 50 in external connection manner. Therefore, replacement or repair of the rotating sensing device 100 may be conducted simply by unloading the rotating sensing device 100 from the rotating element 50 without dismantling the rotating element 50, such that labor costs and repair time may be saved.

Figure 4:
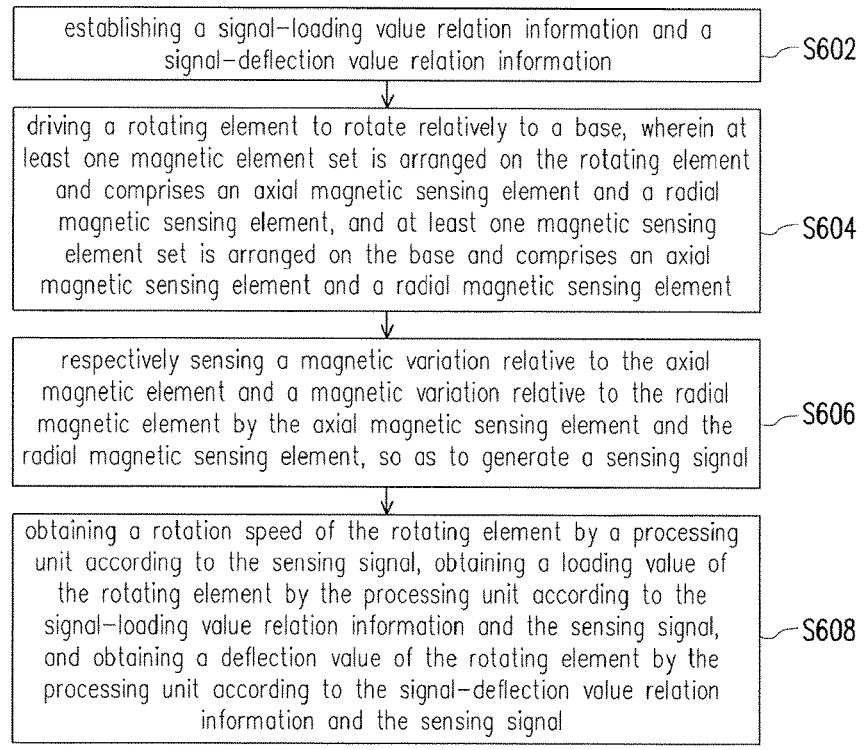
FIG. 4 is a process flow chart of a rotating sensing method according to an embodiment of the disclosure.

The rotating sensing method conducted by the rotating sensing device provided in the present embodiment is illustrated as follows by drawings. FIG. 4 is a process flow chart of a rotating sensing method according to an embodiment of the disclosure. Please refer to FIG. 1 to FIG. 4, first, a signal-loading value relation information and a signal-deflection value relation information are established (step S602). Next, a rotating element 120 is driven to rotate relatively to a base 110, wherein at least one magnetic element set 130 is arranged on the rotating element 120 and includes an axial magnetic element 132 and a radial magnetic element 134, and at least one magnetic sensing element set 140 is arranged on the base 110 and includes an axial magnetic sensing element 142 and a radial magnetic sensing element 144 (step S604). A magnetic variation relative to the axial magnetic element 132 and a magnetic variation relative to the radial magnetic element 134 are respectively sensed by the axial magnetic sensing element 142 and the radial magnetic sensing element 144, so as to generate a sensing signal (step S606). A rotation speed of the rotating element 120 is obtained by a processing unit 150 according to the sensing signal, a loading value of the rotating element 120 is obtained by the processing unit 150 according to the signal-loading value relation information and the sensing signal, and a deflection value of the rotating element 120 is obtained by the processing unit 150 according to the signal-deflection value relation info nation and the sensing signal (step S608). The rotation speed, the loading value, and the deflection value obtained in the step S608 may be displayed through a display interface to be viewed by users, and the disclosure makes no limitation to the form of the display interface. In addition, the rotation speed, the loading value, and the deflection value obtained in the step S608 may be stored as the basis of subsequent modifications or changes to the design of the rotating element 50 of the equipment under test.

A method for establishing the signal-loading value relation information and the signal-deflection value relation information is specifically described below. First, the rotating element 120 is applied with a test load, and a loading value and a deflection value are generated at the rotating element 120 through this test load. Next, a rotating element 120 is driven to rotate relatively to the base 110, and a magnetic variation relative to the axial magnetic element 132 and a magnetic variation relative to the radial magnetic element 134 are respectively sensed by the axial magnetic sensing element 142 and the radial magnetic sensing element 144, so as to generate a sensing signal. The loading value and the deflection value generated through the test load may be obtained by measurement through other appropriate measuring devices, such that the signal-loading value relation information and the signal-deflection value relation information may be obtained according to the sensing signal as well as the loading value and the deflection value of the rotating element 120.

Figure 5:
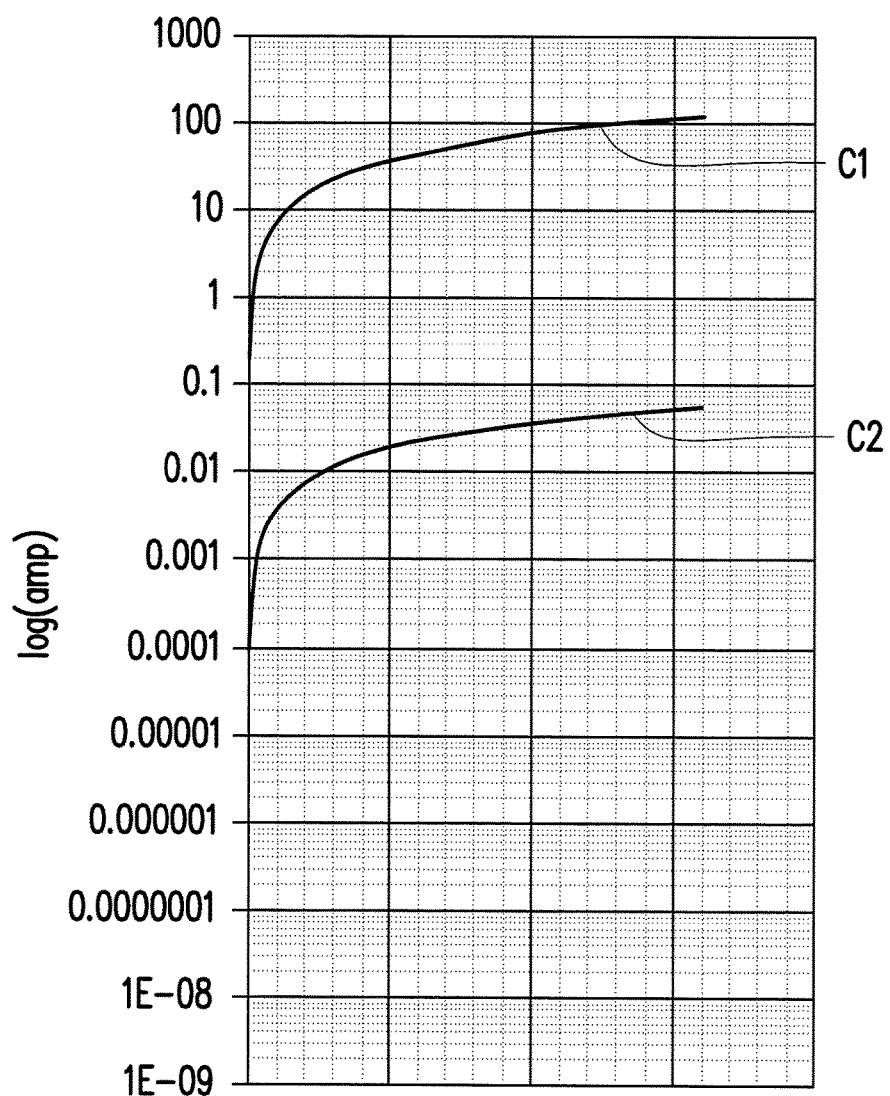
FIG. 5 illustrates signal-loading value relation information and signal-deflection value relation information corresponding to the rotating sensing device in FIG. 1.

FIG. 5 illustrates signal-loading value relation information and signal-deflection value relation information corresponding to the rotating sensing device in FIG. 1. More specifically, the above steps of applying the test load may be repeatedly; that is, through different amounts of test loads, a plurality of sensing signals, a plurality of the loading values, and a plurality of the deflection values corresponding to each other are obtained by driving the rotating element 120 to rotate relatively to the base 110 many times, such that a relation curve (i.e., the relation curve C1 shown in FIG. 5, i.e. the signal-loading value relation information) of the sensing signals and the loading values and a relation curve (i.e., the relation curve C2 shown in FIG. 5, i.e. the signal-deflection value relation information) of the sensing signals and the deflection values may be established. Accordingly, in the step S608, the loading value and the deflection value of the rotating element 120 may be deduced according to the relation curve C1 and the relation curve C2 in FIG. 5 and the sensing signal generated by the magnetic sensing element set 140.

Figure 6:
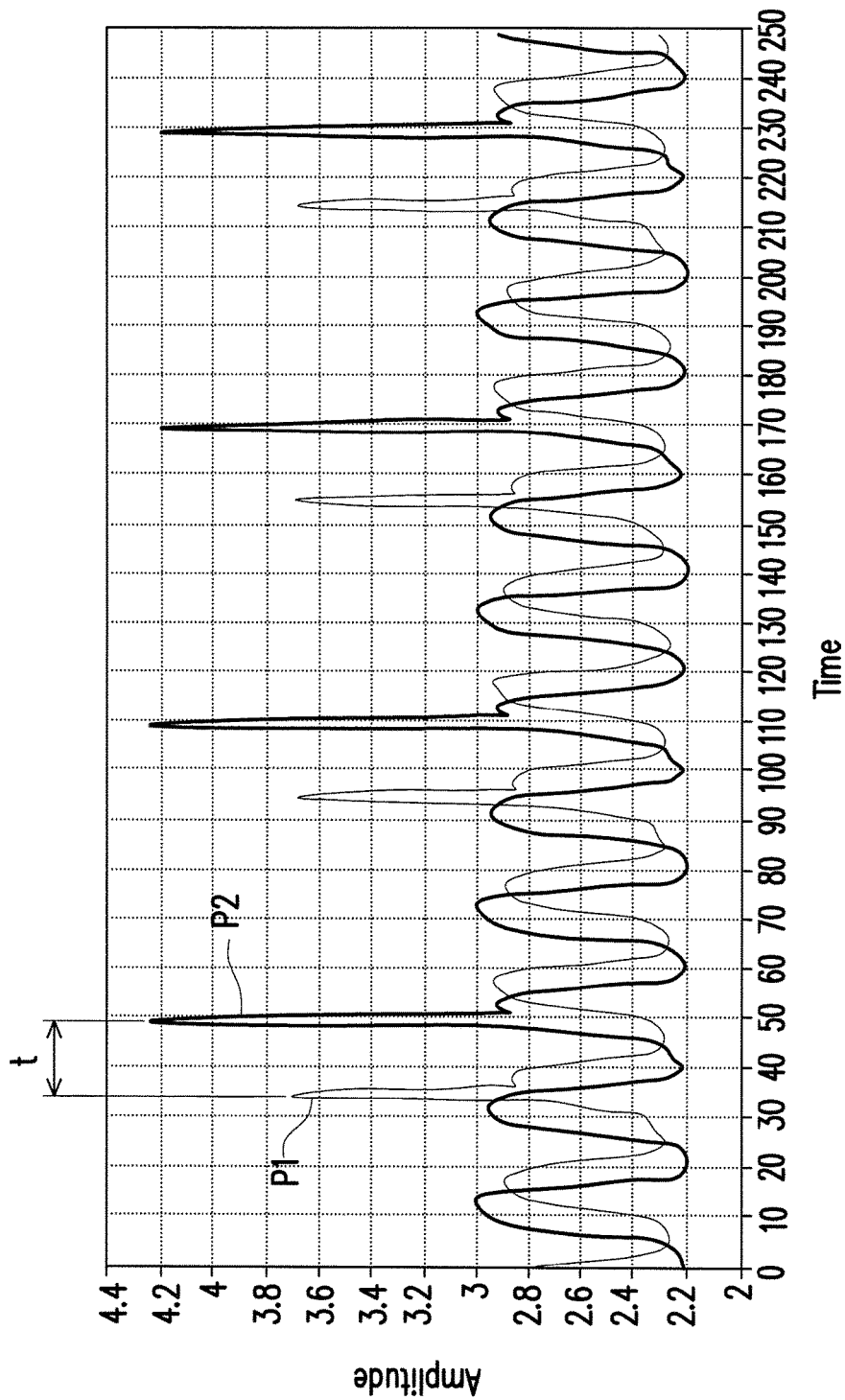
FIG. 6 illustrates the sensing signal of FIG. 4.

A method to obtain the rotating speed of the rotating element 120 in the step S608 is specified below. FIG. 6 illustrates the sensing signal in FIG. 4. For clear illustration, only pulses corresponding to two magnetic sensing element sets in the sensing signal are shown in FIG. 6. In the present embodiment, a magnet with a stronger magnetic force may be used as one of the magnetic element sets 130, such that the magnetic force of the magnet is stronger than the magnetic forces of other magnetic element sets 130, and the pulses P1 and P2 corresponding to the strong magnet may be generated as shown in FIG. 6, which may be identified by the users from observing FIG. 6. Based on the above, the rotation speed of the rotating element 120 may be obtained by the processing unit 150 according to the time span t between the two pulses P1 and P2 of the sensing signal. For example, if there is a 60-degree phase difference between the two magnetic sensing element sets 140 corresponding to the two pulses P1 and P2 shown in FIG. 6, the time span t is the time required by ⅙ rotation of the rotating element 120, and the rotation speed of the rotating element 120 may be deduced. In addition, the rotating direction of the rotating element 120 may be determined by the processing unit 150 according to the order of two sensing signals generated by two of the magnetic sensing element sets 140. For instance, the pulse P1 is prior to the pulse P2 as illustrated in FIG. 6, and it indicates that the rotating element 120 rotates in the clockwise direction. The pulse P2 is prior to the pulse P1, it indicates that the rotating element 120 rotates in the counterclockwise direction.

The detailed structural arrangement of the rotating element device 100 is described below. Please refer to FIG. 2, the base 110 provided in the present embodiment has a first surface 110a and a second surface 110b perpendicular to each other, the rotating element 120 has a third surface 120a and a fourth surface 120b perpendicular to each other, and the first surface 110a and the second surface 110b are respectively aligned with the third surface 120a and the fourth surface 120b. Based on the above, the axial magnetic sensing element 142 and the radial magnetic sensing element 144 are respectively arranged on the first surface 110a and the second surface 110b, and the axial magnetic element 132 and the radial magnetic element 134 are respectively arranged on the third surface 120a and the fourth surface 120b, so that the axial magnetic sensing element 142 and the radial magnetic sensing element 144 are respectively aligned with the axial magnetic element 132 and the radial magnetic element 134. In the present embodiment, the first surface 110a and the third surface 120a are perpendicular to an axial direction of the rotating element 120 (i.e., the extension direction of the axis A), and the second surface 110b and the fourth surface 120b are perpendicular to a radial direction of the rotating element 120.

As shown in FIG. 2, the magnetic element sets 130 provided in the present embodiment are evenly distributed on a periphery of the rotating element 120, the base 110 has a ring-shaped inner wall 110c surrounding the rotating element 120, and the magnetic sensing element sets 140 are evenly distributed on the ring-shaped inner wall 110c and aligned with the magnetic element set 130. In addition, the rotating element 120 provided in the present embodiment has an axial hole 120c and is adapted to be connected to the rotation spindle 54 shown in FIG. 3 through the axial hole 120a. On the other hand, the base 110 provided in the present embodiment may be fixed to the fixed end 52 through locking or other appropriate manners, but the disclosure is not limited thereto.

Above all, the rotation speed, the loading value, and the deflection value of the rotating element provided in the disclosure are simultaneously sensed by the rotating sensing device through the magnetic element set and the magnetic sensing element set, instead of sensing the rotation speed, the loading value, and the deflection value of an object by multiple sensors, so as to save the arrangement costs of the rotating sensing device. Furthermore, when a quantity of the magnetic element set and a quantity of the magnetic sensing element set are both plural, if one of the magnetic sensing elements or the magnetic elements is damaged and fails, the sensing action may be still carried out by other magnetic sensing elements or magnetic elements in no need of immediately repairing and replacing the rotating sensing device, and thus the repair cost is saved and the reliability is guaranteed. In addition, the arrangement space is saved, for the rotating sensing device is not equipped with multiple sensors as provided in the related art. Moreover, the magnetic element set includes the radial magnetic element and the axial magnetic element, and the magnetic sensing element set correspondingly includes the axial magnetic sensing element and the radial magnetic sensing element, thus enabling the rotating sensing device to simultaneously sense the displacement of the rotating element along the axial direction and the displacement of the rotating element along the radial direction. Hence, the loading value and the deflection value of the rotating element are obtained accurately, so as to equip the rotating sensing device with a good sensing ability. On the other side, the rotating sensing device is not embedded in the rotating element of the equipment under test; instead, the base and the rotating element of the rotating sensing device are respectively connected to the fixed end of the rotating element and the rotation spindle of the rotating element in external connection manner. As a result, replacement or repair of the rotating sensing device may be conducted simply through unloading the rotating sensing device from the rotating element without dismantling the rotating element, such that labor costs and repair time may be saved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A rotating sensing device for machine tool, comprising:
   a base;
   a rotating element, connected to the base and configured to rotate relative to the base;
   at least one magnetic element set, arranged on the rotating element and comprising an axial magnetic element and a radial magnetic element;
   at least one magnetic sensing element set, arranged on the base and comprising an axial magnetic sensing element and a radial magnetic sensing element, wherein the rotating element is configured to rotate relatively to the base, a magnetic variation relative to the axial magnetic element and a magnetic variation relative to the radial magnetic element are respectively sensed by the axial magnetic sensing element and the radial magnetic sensing element, so as to generate a sensing signal, wherein the at least one magnetic sensing element set is aligned with the at least one magnetic element set; and
   a processing unit, coupled to the at least one magnetic sensing element set and adapted to obtain a rotation speed, a loading value, and a deflection value of the rotating element according to the sensing signal,
   wherein the base has a first surface and a second surface perpendicular to each other, the rotating element has a third surface and a fourth surface perpendicular to each other, the first surface is aligned with the third surface and the second surface is aligned with the fourth surface, the axial magnetic sensing element and the radial magnetic sensing element are respectively arranged on the first surface and the second surface, and the axial magnetic element and the radial magnetic element are respectively arranged on the third surface and the fourth surface.

2. The rotating sensing device according to claim 1, wherein the processing unit is adapted to obtain the rotation speed of the rotating element according to a time span between two pulses of the sensing signal.

3. The rotating sensing device according to claim 1, wherein a quantity of the at least one magnetic element set and a quantity of the at least one magnetic sensing element set are both plural, and the processing unit is adapted to determine a rotating direction of the rotating element according to an order of any two of the sensing signals generated by any two of the magnetic sensing element sets.

4. The rotating sensing device according to claim 1, wherein the processing unit is adapted to obtain the loading value of the rotating element through the sensing signal according to a signal-loading value relation information.

5. The rotating sensing device according to claim 1, wherein the processing unit is adapted to obtain the deflection value of the rotating element through the sensing signal according to a signal-deflection value relation information.

6. The rotating sensing device according to claim 1, wherein the first surface and the third surface are perpendicular to an axial direction of the rotating element, and the second surface and the fourth surface are perpendicular to a radial direction of the rotating element.

7. The rotating sensing device according to claim 1, wherein the rotating element has an axial hole and is adapted to be connected to a rotation spindle through the axial hole.

8. The rotating sensing device according to claim 1, wherein a quantity of the at least one magnetic element set is plural, and the magnetic element sets are evenly distributed on a periphery of the rotating element.

9. The rotating sensing device according to claim 1, wherein a quantity of the at least one magnetic sensing element set is plural, the base has a ring-shaped inner wall surrounding the rotating element, and the magnetic sensing element sets are evenly distributed on the ring-shaped inner wall.

10. The rotating sensing device according to claim 1, wherein a quantity of the at least one magnetic element set is plural, and a magnetic force of one of the magnetic element sets is greater than magnetic forces of the other magnetic element sets.

11. The rotating sensing device according to claim 1, wherein the axial magnetic sensing element and the radial magnetic sensing element are Hall sensors.

12. The rotating sensing device according to claim 1, wherein the axial magnetic sensing element and the radial magnetic sensing element are magneto-resistive sensors.

13. A rotating sensing method for machine tool, comprising:
   establishing a signal-loading value relation information and a signal-deflection value relation information;
   having a rotating element adapted to rotate relatively to a base, wherein at least one magnetic element set is arranged on the rotating element and comprises an axial magnetic sensing element and a radial magnetic sensing element, and at least one magnetic sensing element set is arranged on the base and comprises an axial magnetic sensing element and a radial magnetic sensing element;

respectively sensing a magnetic variation relative to the axial magnetic element and a magnetic variation relative to the radial magnetic element by the axial magnetic sensing element and the radial magnetic sensing element, so as to generate a sensing signal, wherein the at least one magnetic sensing element set is aligned with the at least one magnetic element set;

obtaining a rotation speed of the rotating element by a processing unit according to the sensing signal, obtaining a loading value of the rotating element by the processing unit according to the signal-loading value relation information and the sensing signal, and obtaining a deflection value of the rotating element by the processing unit according to the signal-deflection value relation information and the sensing signal;

wherein the step of establishing the signal-deflection value relation information comprises:

driving the rotating element to rotate relatively to the base;

respectively sensing the magnetic variation relative to the axial magnetic element and the magnetic variation relative to the radial magnetic element by the axial magnetic sensing element and the radial magnetic sensing element to generated the sensing signal;

measuring a deflection value of the rotating element; and obtaining the signal-deflection relation information through the sensing signal and the deflection value of the rotating element, wherein the step of establishing the signal-loading value relation information comprises:

driving the rotating element to rotate relatively to the base many times to obtain a plurality of the sensing signals and a plurality of the deflection values corresponding to each other; and establishing a relation curve of the sensing signals and the loading values, wherein the relation curve is the signal-deflection value relation information.

14. The rotating sensing method according to claim 13, wherein the step of obtaining the rotation speed of the rotating element comprises:

obtaining the rotation speed of the rotating element by the processing unit according to a time span between any two pulses of the sensing signal.

15. The rotating sensing method according to claim 13, wherein a quantity of the at least one magnetic element set and a quantity of the at least one magnetic sensing element set are both plural, and the method comprises:

determining a rotating direction of the rotating element by the processing unit according to an order of any two of the sensing signals generated by any two of the magnetic sensing element sets.

16. The rotating sensing method according to claim 13, wherein the step of establishing the signal-loading value relation information comprises:

driving the rotating element to rotate relatively to the base;

respectively sensing the magnetic variation relative to the axial magnetic element and the magnetic variation relative to the radial magnetic element by the axial magnetic sensing element and the radial magnetic sensing element to generate the sensing signal;

measuring the loading value of the rotating element; and obtaining the signal-loading value relation information through the sensing signal and the loading value of the rotating element.

17. The rotating sensing method according to claim 16, wherein the step of establishing the signal-loading value information comprises:

driving the rotating element to rotate relatively to the base many times to obtain a plurality of the sensing signals and a plurality of the loading values corresponding to each other; and establishing a relation curve of the sensing signals and the loading values, wherein the relation curve is the signal-loading value relation information.

* * * * *